(12) United States Patent
Ullom (10) Patent No.: US 10,731,081 B2
(45) Date of Patent: Aug. 4, 2020

(54) ZONE-DELINEATED PYROLYSIS APPARATUS FOR CONVERSION OF POLYMER WASTE

(71) Applicant: VADXX ENERGY LLC, Cleveland, OH (US)

(72) Inventor: William L. Ullom, Akron, OH (US)

(73) Assignee: VADXX ENERGY LLC, Cleveland, OH (US)

( * ) Notice: Subject to any disclaimer, the term of this patent is extended or adjusted under 35 U.S.C. 154(b) by 714 days.

(21) Appl. No.: 14/377,429

(22) PCT Filed: Feb. 8, 2013

(86) PCT No.: PCT/US2013/025335
§ 371 (c)(1),
(2) Date: Aug. 7, 2014

(87) PCT Pub. No.: WO2013/119941
PCT Pub. Date: Aug. 15, 2013

(65) Prior Publication Data
US 2016/0017232 A1  Jan. 21, 2016

Related U.S. Application Data

(60) Provisional application No. 61/596,876, filed on Feb. 9, 2012.

(51) Int. Cl.
*C10B 7/10* (2006.01)
*C10G 1/02* (2006.01)
(Continued)

(52) U.S. Cl.
CPC .............. *C10B 7/10* (2013.01); *C01B 32/05* (2017.08); *C10B 53/07* (2013.01); *C10G 1/002* (2013.01);
(Continued)

(58) Field of Classification Search
CPC .. C10B 57/02; C10B 1/08; C10B 1/00; C10B 5/00; C10B 7/10; C10B 31/00;
(Continued)

(56) References Cited

U.S. PATENT DOCUMENTS 595,780 A    12/1897  Krisan
1,756,378 A   4/1930  Oberhuber
(Continued)

FOREIGN PATENT DOCUMENTS

CN    1752184 A    3/2006
CN   102015969 A   4/2011
(Continued)

OTHER PUBLICATIONS

Tanida, Kei-ich, Kouji Honda, Nobuaki Kawano, Toshihiro Kawaguchi, Toshitsugu Tanaka, and Yutaka Tsuji. "Particle Motion in Screw Feeder Simulated by Discrete Element Method." IS&TS NIP 14: 1998 International Conference on Digital Printing Technologies (1998): 429-31. Web. Feb. 28, 2017.*

(Continued)

*Primary Examiner* — Jonathan Miller
(74) *Attorney, Agent, or Firm* — Calfee Halter & Griswold LLP (57) ABSTRACT

Apparatus and method for pyrolyzing hydro carbonaceous materials to produce useful vapor and solid products comprising a generally cylindrical, linear reactor having a screw means for transporting hydro carbonaceous materials through said reactor, means for feeding and heating said hydro carbonaceous materials whereby they are processed and pyrolyzed to produce vapor and solid products; means for removing vapor products from said processed hydro carbonaceous materials, means for removing solid products, means whereby said hydrocarbonaceous material is maintained within a zone for a range of defined residence times, (Continued)

means for rotating said screw, which has a plurality of flight configurations for compressing, and for melting said hydro carbonaceous materials to convert them from a solid to a liquid, for mixing, destabilizing and dehalogenating said hydro carbonaceous materials, for pyrolyzing said hydro carbonaceous materials, for devolatilizing the pyrolyzed hydrocarbonaceous materials, and for discharging solid products.

21 Claims, 2 Drawing Sheets

(51) Int. Cl.
C10G 1/10 (2006.01)
C10B 53/07 (2006.01)
C10G 1/00 (2006.01)
C01B 32/05 (2017.01)
C10B 57/06 (2006.01)

(52) U.S. Cl.
CPC ............... *C10G 1/02* (2013.01); *C10G 1/10* (2013.01); *C10B 57/06* (2013.01); *Y02P 20/143* (2015.11)

(58) Field of Classification Search
CPC ......... C10B 31/12; C10B 37/00; C10B 37/04; C10B 47/18; C10B 57/005; C10B 57/06; C10B 57/12; C10G 51/00
See application file for complete search history.

(56) References Cited

U.S. PATENT DOCUMENTS

| | | | |
|---|---|---|---|
| 2,812,200 A | 4/1930 | Oberhuber | |
| 2,636,202 A | 4/1953 | Hinzman | |
| 3,364,187 A * | 1/1968 | Wiggill | C08F 8/00 |
| | | | 264/211.23 |
| 3,862,265 A * | 1/1975 | Steinkamp | B29C 47/1063 |
| | | | 264/331.17 |
| 3,900,912 A | 8/1975 | Lenz et al. | |
| 4,098,649 A | 7/1978 | Redker | |
| 4,303,477 A | 12/1981 | Schmidt et al. | |
| 4,686,008 A | 8/1987 | Gibson | |
| 4,781,796 A * | 11/1988 | Bridle | C02F 11/10 |
| | | | 202/112 |
| 5,004,533 A | 4/1991 | Kalnes et al. | |
| 5,032,185 A | 7/1991 | Knapp | |
| 5,389,691 A | 2/1995 | Cha et al. | |
| 5,400,456 A | 3/1995 | Skibowski | |
| 5,470,384 A | 11/1995 | Cha et al. | |
| 5,565,161 A | 10/1996 | Auda et al. | |
| 5,566,416 A | 10/1996 | Karls | |
| 5,836,524 A | 11/1998 | Wang | |
| 5,903,946 A | 5/1999 | Collins et al. | |
| 5,954,949 A * | 9/1999 | Ohsol | C10B 55/00 |
| | | | 208/131 |
| 6,070,285 A | 6/2000 | Geppert | |
| 6,126,907 A * | 10/2000 | Wada | C10B 7/10 |
| | | | 110/246 |
| 6,172,275 B1 | 1/2001 | Taduauchi et al. | |
| 6,173,469 B1 | 1/2001 | Laymon | |
| 6,308,363 B1 | 10/2001 | Lino et al. | |
| 6,500,271 B1 | 12/2002 | Moore et al. | |
| 7,101,463 B1 | 9/2006 | Weinecke | |
| 7,344,622 B2 | 3/2008 | Grispin | |
| 7,490,381 B1 | 2/2009 | Franzino | |
| 7,681,634 B2 | 3/2010 | Botnmark et al. | |
| 7,893,307 B2 | 2/2011 | Smith | |
| 7,947,155 B1 * | 5/2011 | Green | C05D 9/00 |
| | | | 201/15 |
| 8,051,523 B1 | 8/2011 | Franzino | |
| 8,011,052 B2 | 9/2011 | Kapustin et al. | |
| 8,192,587 B2 | 6/2012 | Garrison et al. | |
| 8,225,809 B2 | 7/2012 | Krywitsky | |
| 8,239,994 B2 | 8/2012 | Dyck | |
| 8,282,787 B2 * | 10/2012 | Tucker | C10B 47/30 |
| | | | 201/41 |
| 8,316,500 B2 | 11/2012 | Freeman et al. | |
| 8,479,345 B2 | 7/2013 | Ludlow et al. | |
| 8,650,694 B2 | 2/2014 | Pruett et al. | |
| 8,739,345 B2 | 6/2014 | Palmer | |
| 9,150,791 B2 | 10/2015 | Ben-Tovim | |
| 9,222,612 B2 | 12/2015 | Ullom | |
| 2003/0130548 A1 * | 7/2003 | Lemmons | C10B 47/44 |
| | | | 585/241 |
| 2006/0280669 A1 | 12/2006 | Jones | |
| 2007/0113362 A1 | 5/2007 | Lino et al. | |
| 2008/0135244 A1 | 12/2008 | Miller | |
| 2009/0007484 A1 | 1/2009 | Smith | |
| 2009/0031615 A1 | 2/2009 | Joshi et al. | |
| 2009/0227823 A1 | 9/2009 | Huber et al. | |
| 2010/0180391 A1 | 7/2010 | Pruett et al. | |
| 2010/0237291 A1 | 9/2010 | Simmons et al. | |
| 2011/0089015 A1 | 4/2011 | Kelley | |
| 2011/0114467 A1 | 4/2011 | Kelley | |
| 2011/0154592 A1 | 6/2011 | Woo | |
| 2012/0017385 A1 | 1/2012 | Palmer | |
| 2012/0017386 A1 | 1/2012 | Rankin et al. | |
| 2012/0017498 A1 | 1/2012 | Rugg | |
| 2012/0137458 A1 | 6/2012 | Knapp | |
| 2013/0174363 A1 | 7/2013 | Ullom | |

FOREIGN PATENT DOCUMENTS

| | | |
|---|---|---|
| DE | 19724147 A1 | 12/1998 |
| EA | 008993 B1 | 10/2007 |
| EP | 1405895 A1 | 4/2004 |
| EP | 1647589 A2 | 4/2006 |
| EP | 1105224 B1 | 5/2007 |
| JP | H06256769 A | 9/1994 |
| RU | 2149047 C1 | 5/2000 |
| RU | 2217468 C1 | 11/2003 |
| RU | 2326926 C2 | 9/2005 |
| RU | 2320699 C1 | 3/2008 |
| RU | 96217 U1 | 7/2010 |
| RU | 2421502 C1 | 6/2011 |
| RU | 2436851 C2 | 12/2011 |
| UA | 50430 U1 | 6/2010 |
| WO | 2002026914 A2 | 4/2002 |
| WO | 2006092306 A1 | 9/2006 |
| WO | 2008058137 A2 | 5/2008 |
| WO | 2011035812 A1 | 3/2011 |
| WO | 2012093079 A2 | 7/2012 |

OTHER PUBLICATIONS

Screw Conveyor Corporation. "Catalog and Engineering Manual." 2010. p. 11. <http://www.screwconveyor.com/assets/1/7/Engineering_Catalog_1-2010.pdf>.*
Notice of Allowance from U.S. Appl. No. 13/735,677 dated Jul. 23, 2015.
First Office Action from Chinese Patent Application No. 201380009739.2 dated Jun. 5, 2015.
First Office Action from Chinese Patent Application No. 201380008981.8 dated Jul. 2, 2015.
Search Report and Written Opinion from Singapore Application No. 11201404709R dated Aug. 17, 2015.
Extended European Search Report from Application No. 13749308.6 dated Oct. 7, 2015.
European Search Report from Application No. 13747008.4 dated Dec. 9, 2015.
Office Action from U.S. Appl. No. 14/936,028 dated Sep. 23, 2016.
First Office Action from Chinese Application No. 201510301167.6 dated May 25, 2016.
Extended European Search Report from Application No. 13747008.4 dated Mar. 31, 2016.
Extended European Search Report from Application No. 15179432.8 dated Feb. 24, 2016.

(56) References Cited

OTHER PUBLICATIONS

Examination Report No. 1 from Australian Application No. 2013216895 dated Oct. 25, 2016.
Communication Pursuant to Article 94(3) from European Application No. 13749308.6 dated Dec. 6, 2016.
Second Office Action from Chinese Application No. 201510301167.6 dated Mar. 17, 2017.
English Translation of Office Action from Israeli Application No. 234,110 dated Jul. 31, 2016.
Office Action from Russian Application No. 2014134429 dated Jan. 18, 2017.
Examination Report from Singapore Application No. 11201404709R dated Mar. 14, 2016.
Office Action from U.S. Appl. No. 14/378,994 dated Mar. 13, 2017.
USTINOV, Accounting Chemistry of the Process When Selecting the Temperature Regime in the Pyrolysis Unit, Electronic Scientific Journal "Oil and Gas Business", 2011, No. 3, pp. 208-214, English Abtract (8 pages).
International Search Report and Written Opinion from PCT/US2013/026412 dated Apr. 19, 2013.
International Preliminary Report on Patentability from PCT/US2013/026412 dated Aug. 19, 2014.
International Search Report and Written Opinion fromPCT/US2013/025335 dated Apr. 23, 2013.
International Preliminary Report on Patentability from PCT/US2013/025335 dated Aug. 12, 2014.
Non Final Office Action from U.S. Appl. No. 13/735,677 dated Nov. 26, 2014.
Response to Office Action from U.S. Appl. No. 13/735,677 dated Mar. 26, 2015.

\* cited by examiner

ZONE-DELINEATED PYROLYSIS APPARATUS FOR CONVERSION OF POLYMER WASTE

CROSS-REFERENCE TO RELATED APPLICATION

This application is the U.S. national phase entry of PCT/US2013/025335, with an international filing date of 8 Feb. 2013, which claims the benefit of U.S. provisional application Ser No. 61/596,876 with a filing date of 9 Feb. 2012, the entire disclosures of which are fully incorporated herein by reference.

BACKGROUND OF THE INVENTION

The present invention relates to an apparatus for the conversion of polymer waste, whether in solid and/or liquid form, herein interchangeably described as hydrocarbonaceous material, polymer waste and/or polymeric material, to condensable, non-condensable and solid hydrocarbon products. Condensable hydrocarbon products include synthetic petroleum and a variety of its fractions including but not limited to light sweet crude oil, fuel additives, base oil, slack wax, paraffin wax, microcrystalline wax and condensate dominated by aromatic petroleum hydrocarbons. The non-condensable hydrocarbon product is a gas. The solid hydrocarbon product is a finely divided carbon char. In particular, the present invention is a continuous, zone-delineated pyrolysis apparatus, having capability to simultaneously produce multiple products, one of which, a hard wax, is produced from the apparatus at temperatures lower than typical pyrolysis conversion temperatures.

Converting waste polymers to obtain useful end products via pyrolysis has been a goal sought by many, for many years. Prior art involving pyrolytic decomposition of polymers largely relies on batch, semi-batch or serial batch processes limited in commercially viable application by their operating complexity and inability to continuously process mixed, poorly sorted and/or contaminated polymer waste without fouling. Many claim that serial batch processes comprised of a series of batch reactors progressively operated in a set sequence are "continuous" merely because some product is constantly being discharged from one or more exit ports connected to the batch reactors by a manifold or other suitable exit configuration. Polymer conversion processes include the primary processes of chemical depolymerization, gasification with partial oxidation, and thermal cracking, including pyrolysis, either with or without catalytic cracking and reforming, as well as the secondary process of hydrogenation. Chemical depolymerization has mainly been limited to decomposition of polyesters e.g. PET, and polyurethanes, with secondary application to polyamides, polycarbonates and polyacetals. This method is generally restricted to decomposition of condensation polymers, targeting monomer yield.

Gasification and partial oxidation of waste polymers typically targets production of mixtures of carbon monoxide and hydrogen generally known as syngas. Although partial oxidation can be a more efficient process than steam methane reformation in terms of reactor size and process rate, partial oxidation produces a lower comparative hydrogen yield. Little, if any, condensable hydrocarbons are produced.

Thermal cracking processes employ thermal decomposition resulting in complex mixtures. Reaction temperature, coupled with molecular retention times within respective desired temperature ranges, is the most significant reaction variable, influencing both polymer conversion and molecular distribution of conversion products. Accordingly, efficient control of reaction temperature and residence times is paramount in importance to maximize yield of the desired product mix. Batch, semi-batch and serial batch processes experience difficulty in efficiently achieving and maintaining control of reaction temperatures and residence times due to problems resulting from, among other things, inefficient heat transfer through the waste polymer as this polymer appears to exhibit poor thermal conductivity. Unlike continuous processes, which achieve a dynamic process equilibrium thereby maintaining control of reaction temperatures and residence times, batch, semi-batch and serial batch processes are continually in a state of disequilibrium, posing chronic control challenges with every process cycle and acute problems of reactor fouling. Other variables, including catalysts, are optimizers; although catalytic cracking and reforming offers advantages of polymer breakdown at lower temperatures and higher rate with added control on product quality, catalytic cracking poses challenges including process complexity, deposition of residues hindering activity, poisoning of catalysts, high capital and operating cost of catalyst reactors, and cost of disposal of spent catalyst.

Hydrogenation is a basic step in petroleum refining and petrochemical production that has been applied to secondary processing of oil resulting from thermal cracking processes. This secondary method, often coupled with distillation, is employed in the production of petroleum-based fuels and process cuts where hydrogen saturation of olefins and removal of heteroatoms is required. Hydrogenation is capital intensive, and can have high operating cost attributed to high pressure operation, cost of hydrogen, cost of removing waste heat, and other factors. The term "heteroatom" is understood to mean any atom that is not carbon or hydrogen, and has been applied to indicate that non-carbon atoms have replaced carbon in the backbone of the molecular structure or replaced hydrogen or alkyl groups bonded to the backbone of the molecular structure. Typical heteroatoms are nitrogen, oxygen, sulfur, phosphorus, chlorine, bromine, fluorine and iodine. Hydrogenation is a secondary process deployed in petroleum refining and petrochemical production.

Prior art systems and processes have not achieved wide acceptance or success involving pyrolytic decomposition of polymers and this has been attributed to high operating costs, inability to consistently process contaminated waste streams and waste streams of varying composition, the prohibitively high cost or lack of market availability of uncontaminated raw material streams, inability to reliably and efficiently control temperature and pressure process conditions, inability to consistently supply adequate quantities of in-specification raw material to plants requiring high volumes of material to sustain operations, inability to control system fouling by char, terephthalic acid, benzoic acid, minerals, metals and the like, attempts to produce fuel having comparatively narrow ranges of market-driven specifications from widely varying raw material compositions, inability to control heteroatom content of product oil thus limiting market acceptance of the products, inability to consistently and effectively manage safety issues attributed to worker exposure to hazardous vapors and solids in every batch reactor cycle, and generation of hazardous waste including but not limited to char, waste water and off-specification hydrocarbonaceous liquids.

More specifically, prior art involving batch or semi-batch processes must overcome challenges of thermal inefficiency to promote conversion. Given that polymer waste has poor thermal conductivity, most batch reactor systems rely on some configuration of mixing elements within the reactor or complex arrays of raw material-containing cartridges placed into the batch reactor or concentric tubular devices containing raw material subjected to thermal energy or tubular heat transfer geometries deployed within the body of the batch reactor and the like, with the intent to increase raw material surface area, thereby increasing surface exposure to thermal energy which is otherwise poorly conveyed through material having poor thermal conductivity. The large number of batch reactor configurations that have sought patent protection is consistent with a broad-spectrum series of attempts to solve the heat transfer and process control challenges inherent to batch reactor systems. Complex mechanical and/or geometric solutions to the limitations are inherent to batch reactors.

Additionally, most if not all batch reactors, whether singly or in series, must be charged with hydrocarbonaceous raw materials, purged of atmospheric air containing oxygen, heated to the desired temperature when product vapors are extracted, then cooled to a temperature below flash point of the residual solids to facilitate their removal. The repeated thermal cycles experienced by these systems have poor thermal efficiency resulting in overconsumption of energy to complete the polymer conversion.

In an embodiment of the batch process, U.S. Pat. No. 8,192,587 to Garrison et al provides limited means of process control. In a batch reactor, all of the chemistries in the batch reactor described by Garrison are decomposed at successive times in the same three-dimensional space. Without the addition of the complex geometric means in Garrison to increase surface area available for heat transfer in a batch reactor by circulating heat transfer fluid through a sealed heating system, temperature control over the internal cross section of the reactor is poor because of poor thermal conductivity and varying material densities in the raw material charge. Such material densities change as conversions occur and mass is removed from the reactor via discharge of vapor. Moreover, poor thermal conductivity of polymer raw materials in a batch reactor, such as in Garrison, even with internal heat transfer fluids deployed results in varying degrees of raw material thermal transfer capacity across the complex cross section of the batch reactor. Additional complexity arises from change in thermal conductivity of the raw material as its composition changes as it decomposes. Further inefficiency in a batch reactor system such as in Garrison results from deposition of heavy oligomer, polynuclear aromatic hydrocarbons, asphaltines and/or char upon the surface of the internal heat transfer system and upon the surface of the reactor body itself, thereby offering an incomplete thermal conductivity solution to promotion of efficient heat transfer. As waste polymer decomposes in place in an unstirred reactor as described by Garrison, deposition of char on the internal surface of the reactor for much of the reactor cycle promotes formation and adsorption of aromatic and polynuclear aromatic hydrocarbons onto the surface of the char. Unless those aromatic and polynuclear aromatic hydrocarbons are removed from the char or unless this adsorption is prevented, disposal of the char created by the batch process can be rendered prohibitively expensive if it is characterized as a hazardous waste. As with all batch reactors, at the end of each process cycle, the char must be removed.

U.S. Pat. Nos. 5,389,961 5,740,384 to Cha et al describe a continuous, two-step thermal process for co-recycling scrap tires and oils. This prior art processes scrap tire with relatively large amounts of used motor oil, cylinder oil, vacuum tower bottoms and the like Cha describes a dual-reactor system operated in series whereby a transfer point between the two reactors is required to discharge un-reacted material from the first inclined reactor to the second horizontal reactor. This transfer point results in operational challenges as a result of fouling. Cha describes a cross-sectional shape of the dual-reactor system which provides for an open headspace through which un-reacted tire components, including steel fibers, could move, said open headspace posing a challenge to efficient transport of raw material up the incline of the first reactor. Cha describes operating the inclined reactor at increasing temperature, and operating the horizontal a higher temperature to drive off volatile hydrocarbons from the char.

U.S. Pat. No. 5,836,524 to Wang describes a process that processes solid polymer waste and used lubricating oils or recycled heavy oil in a single continuous step at relatively low temperatures. This prior art employs a continuous process inclined screw having no means for control in rate of temperature ramp and control of residence time. Wang recognizes that process yield is a function of temperature.

U.S. Pat. No. 6,172,275 to Tadauchi et al describes a pyrolysis method and apparatus for decomposing waste plastic which may contain organic chlorine. Tadauchi teaches the use of heating zones for decomposition of plasticizers and for dechlorination of halogenated polymer including polyvinyl chloride (PVC), by which the plasticizers can be decomposed to oil and hydrochloric acid, which can evolve from PVC. Both the oil and the hydrochloric acid are separately recovered. Tadauchi further describes condensation and isolation of wax from lighter molecules which may contain organic chlorine compounds, and further pyrolyzing of that wax fraction to light oil. Tadauchi teaches plasticizer decomposition and hydrochloric acid evolution, noting only that additional decomposition occurs at temperatures at or above 450° C. (842° F.) to produce a pyrolysis product, which can be light oil dominated by 4-15 carbon atoms. Tadauchi teaches that the material remaining after decomposition of plasticizers and recovery of hydrochloric acid are subjected to a pyrolysis process generally exceeding 450° C. (842° F.). Tadauchi describes a vacuum to remove hydrochloric acid from the plastic and increasing reactor pressure coincident with pyrolysis to shift molecular distribution toward lighter molecules having 4-15 carbon numbers.

U.S. Pat. No. 7,344,622 to Grispin describes what is called a continuous process wherein control upon the composition of liquids resulting from the thermal decomposition of polymer waste is achieved by maintaining a slow heating rate in the substantial absence of oxygen, creating a char bed having a thermal gradient. Grispin suggests that the nature of the char bed, reactor size, the amount of raw material charge, heating rate and the substantial exclusion of oxygen are simultaneously related to the composition of the product. The process described by Grispin operates by achieving a controlled single heat ramp for an optimal time period in a reactor targeting a relationship between reactor volume and reactor charge, to impact the composition of the oil formed thereby. Grispin's teaching is for a process for the production of aromatic fractions having 6-12 carbon numbers.

U.S. Pat. No. 7,893,307 to Smith describes a process whereby "hydrocarbon-formable materials, such as plastics and other waste or other recycled materials" are melted in a "viscous shear apparatus" such as an extruder and introduced into a device described as a "ribbonchannel" reactor wherein a cylindrical ribbon of melted plastic having a thin cross-sectional area is advanced and wherein pyrolytic decomposition of the plastic occurs. The intent of this design is to maximize surface area available to heating by exposing the thin body of melted material to a skin temperature far above that which is necessary to promote polymer decomposition, thus imparting a high thermal gradient to the material in the reactor. The temperature of melt exiting the viscous shear apparatus and entering the ribbonchannel reactor is claimed to range from about 238° C. (460° F.) to about 315° C. (600° F.). In the Smith process, effective dechlorination, if any, occurs between about 300° C. (572° F.) to about 365° C. (690° F.). Smith further discloses that residual material is discharged from the ribbonchannel reactor in a temperature range from about 524° C. (975° F.) to about 538° C. (1000° F.). To achieve decomposition in the ribbonchannel reactor, the skin temperature/heating element temperature of the ribbon channel reactor ranges from about 760° C. (1400° F.) to about 1315° C. (2400° F.) in an effort to efficiently heat the thin cross section of material filling the ribbon channel by maintaining a high temperature differential between the reactor skin and internal reactor temperature. This heating results in internal ribbonchannel reactor temperatures increasing from 338° C. (640° F.)-368° C. (694° F.) up to 393° C. (740° F.)-524° C. (975° F.) where pyrolytic decomposition is achieved, optionally in the presence of a melt-phase catalyst. Char material, dirt, and small pieces of metal are discharged at the end of the process about 524° C. (975° F.) to about 538° C. (1000° F.). Smith's teaching is to a process throughput of 3,000 to 10,000 pounds per hour, and focuses on the geometry of the ribbonchannel reactor to optimize rapid heat transfer. The extruder and ribbonchannel reactor cannot accept particles larger than the clearance between the extruder screw and barrel, or the effective distance between the inner diameter of the outer heated cylinder and the outer diameter of the inner heated cylinder, whichever is smaller. In the exemplary case of rubber, Smith articulated far smaller particle sizes including crumb. Smith focuses only on providing a solution to effective heat transfer.

SUMMARY OF THE INVENTION

An apparatus and method of operation for continuous pyrolysis of hydrocarbonaceous materials to produce useful vapor and solid products comprising a generally cylindrical, linear reactor having a screw means for transporting hydrocarbonaceous materials through said reactor, means for feeding and heating said hydrocarbonaceous materials whereby they are processed and pyrolyzed to produce vapor and solid products, wherein said screw means extends substantially the length of said reactor; means for removing vapor products from said processed hydrocarbonaceous materials, means for removing solid products, means whereby said hydrocarbonaceous material is maintained within a zone for a range of defined residence times, means for rotating said screw, which has a plurality of flight configurations for compressing, and for melting said hydrocarbonaceous materials to convert them from a solid to a liquid, for mixing, destabilizing and dehalogenating said hydrocarbonaceous materials, for pyrolyzing said hydrocarbonaceous materials, for devolatilizing the pyrolyzed hydrocarbonaceous materials, and for discharging solid products.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION OF THE INVENTION

The present invention is a zone-delineated continuous pyrolysis apparatus for conversion of hydrocarbonaceous material. It is a generally cylindrical, linear, heated, continuous reactor having an auger or screw in the center of the reactor, along its axis, with capability to simultaneously discharge end products both before and after an integral series of step-down condensers. It operates in a continuous manner. Moreover, it is a modular and scalable pyrolysis apparatus capable of converting polymer waste and low-value or contaminated polymers to synthetic petroleum and a variety of its fractions, including but not limited to, light sweet crude oil, fuel additives, base oil, slack wax, paraffin wax, microcrystalline wax and condensate dominated by aromatic petroleum hydrocarbons. The non-condensable hydrocarbon product is a gas. The solid hydrocarbon product is a finely divided carbon char which may or may not contain non-polymer solids if such non-polymer solids are present in the raw material prior to its decomposition. The reactor has a central rotating shaft with sections having varying auger or screw configurations to mix and/or advance the polymer to be converted.

The present invention has the flexibility to allow, and capacity to produce and separately discharge, a primary microcrystalline or paraffin wax product having, collectively, 30-70 carbon atoms via direct discharge from the apparatus, in a preferred embodiment, at the end of the fourth of seven continuously operated, series-oriented process zones, hereinafter referred to as Zones. Specifically, this occurs after the Mixing, Molecular Destabilization and Heteroatom Scavenging Zone, within a temperature range of 300° C. to 338° C. (572° F. to 690° F.), a temperature threshold not previously identified from which consistent yield of microcrystalline or paraffin wax product could be achieved. Further, in a preferred embodiment, it allows additional and simultaneous capacity to produce one or more additional, lighter fractions collectively having 4-30 carbon numbers recovered from separate discharge ports located in the fifth and sixth continuously operated, series-oriented process Zones, namely, the Pyrolysis Zone and the Char and Residual Solids Devolatilization Zone, respectively, via subsequent recovery of pyrolysis vapor in a series of step-down condensers, with optional demisters in plurality with respective condensers when very highly efficient separation is required, operating at progressively colder operating temperature ranges. The apparatus requires no deployment of catalyst reactors and/or reflux reactors and/or fractionation columns, although the modularity and scalability of the apparatus which is the subject of this invention provides opportunity for optional deployment of those additional devices in examples when, for example, production of only light oil, diesel additive or gasoline additive is required.

Raw material feed to the apparatus can be a combination of mixed and/or varying solids with mixed and/or varying proportions of petroleum-based liquids, if any. Zone-delineated process control provides for efficient conversion of widely variable raw material streams, highly contaminated raw material streams, and raw material streams having inconsistent compositions over time. Clean, uncontaminated raw material feed streams are not required. Even contamination of the polymer waste by pesticides, herbicides, petroleum products, pharmaceuticals and the like is well tolerated. Certain characteristic and listed hazardous wastes can constitute or be included as a component of the hydrocarbonaceous raw material if the apparatus is operated pursuant to an EPA Permit to Operate a Hazardous Waste Storage, Treatment, and Disposal Facility.

Figure 1:
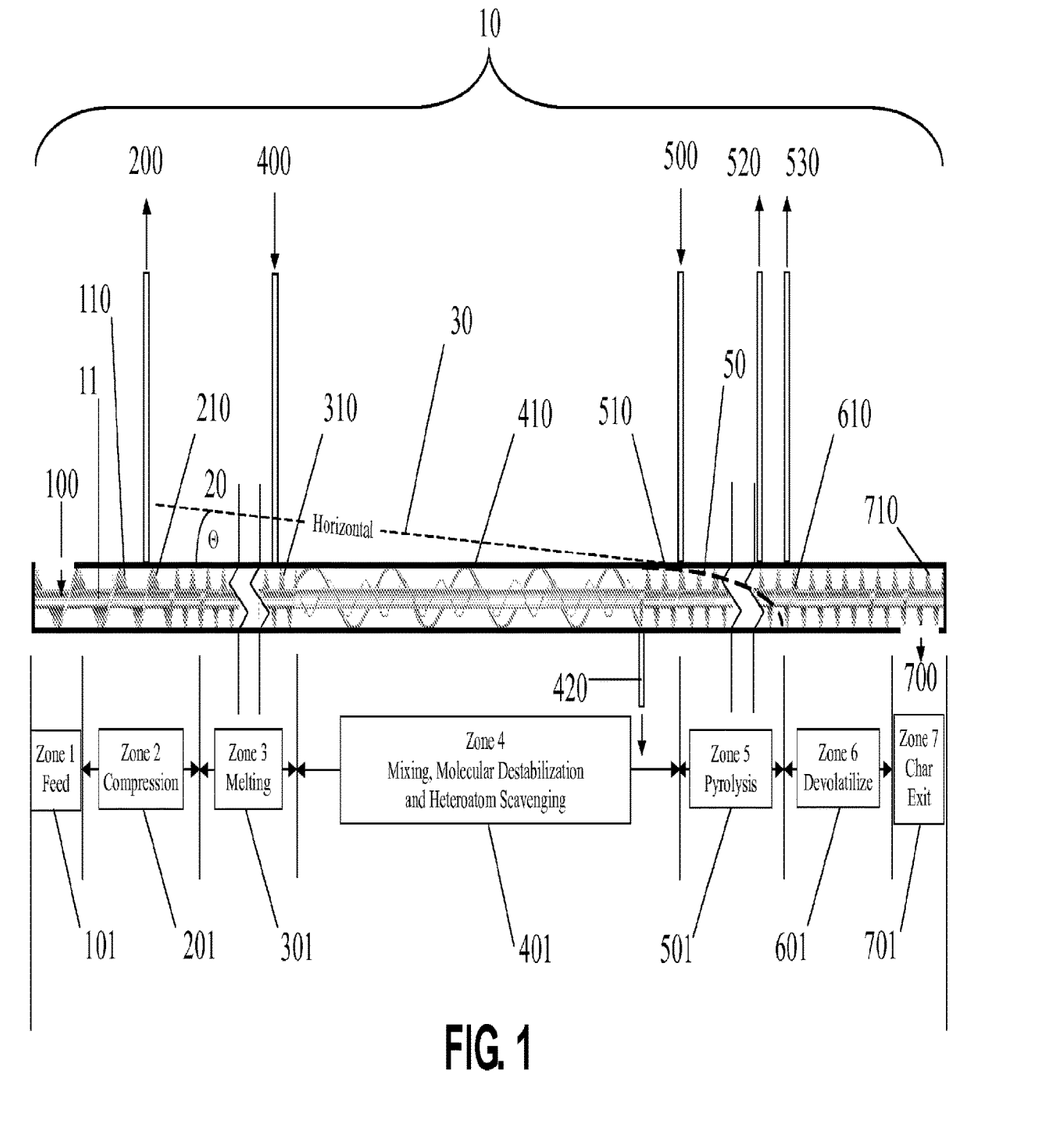
FIG. 1 is a schematic side view of a zone-delineated thermal reactor in accordance with the present invention.

The present invention includes a Zone-delineated, continuous pyrolysis apparatus 10 for conversion of hydrocarbonaceous material, one embodiment of which is illustrated in FIG. 1. It is a continuous, modular and scalable apparatus for manufacturing condensable hydrocarbon products. These hydrocarbon products include synthetic petroleum and a variety of its fractions including but not limited to light sweet crude oil, fuel additives, base oil, slack wax, paraffin wax, microcrystalline wax and condensate dominated by aromatic petroleum hydrocarbons. The non-condensable hydrocarbon product is a gas. The solid hydrocarbon product is a finely divided carbon char plus recyclable metals and/or aggregates. This solid hydrocarbon product will also be described herein as "solid residue" or "solid products."

It is a generally cylindrical, linear, heated reactor 10 having an auger or screw 11 in the center of the reactor 10, along its axis. It operates in a continuous manner. Moreover, it is a modular and scalable pyrolysis apparatus capable of converting polymer waste and low-value or contaminated polymers, collectively, 100, to liquid and/or condensable hydrocarbon products including synthetic petroleum and a variety of its fractions including but not limited to light sweet crude oil, fuel additives, base oil, slack wax, paraffin wax, microcrystalline wax and condensate dominated by aromatic petroleum hydrocarbons. Many of the waxes discussed herein exit the reactor in a liquid phase, but tend to cool to a solid or slow-flowing liquid once collected. For this reason and for purposes of consistency and for purposes of this invention, wax and waxes, regardless of where they are recovered in the process, will be treated as solids, solid products, and/or solid residue(s), unless specifically indicated otherwise.

This reactor 10 has a central rotating shaft 11 with sections, also hereinafter referred to as Zones, having varying auger or screw configurations. An optimum product mix is achieved by determining and establishing a variety of progressive temperature zones to affect optimal temperature ramps, and by varying screw configurations along the length of the reactor to control residence time within each respective temperature zone. This creates a plurality of temperature ramps and retention times (soaks) resulting in the apparatus of the present invention, which operates as a continuous process, having the thermal efficiency advantage of Zone-delineated conversion. The feed to the apparatus can be a combination of mixed and/or varying solids with mixed and/or varying petroleum-based liquids, collectively the "hydrocarbonaceous material" 100. As used herein "petroleum-based liquids" and "hydrocarbon liquids" will be used interchangeably and is meant to include used oil, waste oil, gasoil, refinery bottoms, cylinder oil, and the like. The process control provides for efficient conversion of widely variable raw material streams, highly contaminated raw material streams, and raw material streams having inconsistent compositions over time.

The apparatus of the present invention accepts shredded polymer waste 100, which may or may not be contaminated by non-polymer fractions. For this purpose, in addition to thermoplastic and thermoset plastics ("plastic"), "polymer waste" can include elastomers (or "waste elastomers") such as scrap tires, rubber residue, rubber belting, EPDM rubber sheet, membrane or extrudate, and the like. This polymer waste is continuously fed to a Zone-delineated thermal reactor 10. Petroleum based liquid in any proportion and/or mineral-based additives and/or melt-phase catalyst can also be added if desired to the reactor at the beginning of the zonal sequence 101 (Zone 1), and are mixed with the polymer waste in the reactor. As the raw material charge is advanced along the length of the reactor, phase change occurs as it is progressively compressed or otherwise experiences reduction in volume in Zone 2 201 to expel entrained atmospheric air and heated via a temperature ramp or gradient until entrained moisture in the polymer waste boils, resulting in steam formation, and subsequent melting in Zone 3 301. The melt is then heated in another thermal ramp and advanced through a mixing, molecular destabilization and heteroatom scavenging zone (Zone 4) 401 of controlled maximum temperature in the reactor. Mixing of the melt in this zone (Zone 4) 401 over a controlled residence time and temperature results in molecular destabilization, decomposition of cellulose to char and additional steam, decomposition of a number of plasticizers and organic additives to vapor recoverable as condensable petroleum product, near complete scavenging of sulfur, near complete reduction of the organic halogens chlorine and bromine, partial reduction of the organic halogen fluorine, and near complete reduction of terephthalic acid to benzoic acid and benzoic acid to benzene. Hard wax product can be discharged from Zone 4 401 at its termination and transition to Zone 5 501. Remaining melt which has not been discharged directly from the thermal reactor at the termination of Zone 4 401 to recover hard wax is subsequently advanced through another thermal ramp to a zone (Zone 5) 501 in which the majority of pyrolysis occurs. This pyrolysis occurs over a residence time optimized per category of raw material to be decomposed. Advancing the remaining mass through a Zone 5 501 environment of controlled maximum temperature and adequate residence time results in pyrolysis products of optimum yield and composition. As the remaining mass exits the pyrolysis zone 501, it experiences yet another thermal ramp at the introduction to Zone 6 601, thereby promoting devolatilization of the char and coking of residual aromatic hydrocarbons and polynuclear aromatic hydrocarbons over adequate residence time. Accordingly, after the residual solid moves from Zone 6 601 to Zone 7 701, it is continuously discharged from Zone 7 700 as dry and friable, finely divided, residual solid material, which is not saturated with adsorbed aromatic and polynuclear aromatic hydrocarbons. These remaining solids are continuously removed from the apparatus as char which may contain entrained metals (precious and/or nonprecious), glass, stones and the like if these contaminants are present in the raw material feed. Stated another way, "char" is carbon residue and residual solids other than carbon remaining from the decomposition of hydrocarbonaceous material.

Hydrocarbonaceous materials are introduced as a blend of raw material 100 into a primary, thermal, anaerobic, inclined, Zone-delineated screw reactor 10. The reactor has a cross section and magnitude of incline 20, if any, or optional decline 20, if any, as selected to promote transport, mixing and reaction of differing raw hydrocarbonaceous materials as well as to discharge paraffin or microcrystalline wax from discharge port 420 at the termination of Zone 4 401 and/or condensable hydrocarbons from discharge ports

520 and 530 located in Zone 5 501, and residual solid char from exit 700 in Zone 7 701. The varying screw configurations are coupled with a plurality of temperature zones. As this is a single piece of equipment, operated in a continuous process, there may not necessarily be clear demarcations between Zones, such that one Zone might incidentally transition or overlap with the succeeding Zone.

The Zones are generally defined and/or delineated by the geometry of the internal screw or auger in plurality with its external reactor to establish desired respective Zonal residence times coupled with the respective operating temperature maintained in that Zone for each desired rate of process throughput. Design of a cylindrical, continuous process Zone-delineated thermal reactor is conducted to allow for construction of that reactor having adequate but not unnecessary length at its respective diameter to promote adequate heat transfer to the hydrocarbonaceous material over the appropriate residence time in each Zone, thereby accomplishing the desired chemical reactions over required residence times to desired magnitudes of completion for the desired overall rate of process throughput. Preferably, continuous reactor components are designed in context of an interactive thermal and kinetic model incorporating variables including, among other things, reactor orientation, reactor length, reactor diameter, materials of reactor construction, screw design, hydrocarbonaceous material throughput rate, density and thermal conductivity, kinetic viscosity, Zonal retention time, inter-Zonal temperature ramp, etc. That model must have the capacity to forecast the outcome of operating the present invention to decompose any raw material composition which may be encountered with a desired or tolerable outcome. In the absence of such a model, an optimal geometry may or may not be derived from trial and error which can, especially in this context, have undesired or even catastrophic results.

The geometry of a screw conveyor typically is determined by the ratio of flight outside diameter to spacing between flights (blades). This ratio will be referred to as "pitch" or "pitch ratio" herein. The typical ratio of flight outside diameter to blade spacing is 1:1, or a pitch ratio of 1, where the spacing to outside diameter is equal. This will be a standard pitch, with lesser spacings being, for example, a shorter pitch or pitch ratio greater than 1:1, or a half pitch or pitch ratio of 2:1 resulting in longer residence time, or a quarter pitch or pitch ratio of 4:1 resulting in an even longer residence time, or greater spacings being a long pitch or pitch ratio of less than 1:1 resulting in a shorter residence time. The embodiment of the present invention illustrated in FIG. 1 also includes a mixing section coincident with Zone 4 401, in which a ribbon mixer 410 having open segments with flighting designed to promote mixing, rather than transport, is deployed between adjacent screw conveyor segments 310 and 510. Accordingly, Zone 1 101, Zone 2 201 and Zone 3 301, collectively, of the present invention serve as a screw reactor, Zone 4 401 serves as a plug reactor, and Zone 5 501, Zone 6 601 and Zones 7 701, collectively, serve as a screw reactor. The diameter of the apparatus is constant; the ratio within the screw conveyor sections can change because the blades are more closely spaced or more widely spaced.

Other embodiments of the present invention having process zones beginning with raw material introduction into the system (Zone 1 101), then proceeding with volume reduction and/or compression (Zone 2 201), the proceeding with raw material phase change to melt (Zone 3 301), then proceeding with decomposition of certain plasticizers and additives as well as evolution of hydrochloric acid, among other things, concurrent and/or subsequent molecular destabilization (Zone 4 401), then proceeding with pyrolytic decomposition (Zone 5 501), then proceeding with char devolatilization and/or coking (Zone 6 601), and ending with discharge of solid product (Zone 7 701) can be deployed in any configuration over a wide variety of scalabilities to accommodate all economically viable throughput solutions. The system embodied by the present invention is modular, scalable and versatile, being adaptable to applications having varied raw material compositions and desired throughput rates. Examples of the present invention's versatility include application of a Zone-delineated process to any system configuration. Note that while some but not all of the preferred embodiments of this invention are described in the following detailed descriptions of the invention, a variety of modifications and changes within the spirit of the invention will become evident to persons skilled in the art from disclosures made in the preceding and following detailed descriptions. Accordingly, the preceding and following descriptions are not limitative of the present invention.

It should be noted that in this application, the terms "reactor", "retort" and "apparatus" are frequently used interchangeably. In all cases, unless noted otherwise, these terms refer to the present invention.

This reactor 10 features a generally cylindrical, linear reactor having a long central rotating shaft 11, running the length of the apparatus, comprising sections having varying auger or screw configurations. The precise means of rotating the shaft 11 is not critical, and can include any means known in the industry. The varying screw configurations coincide with and delineate a plurality of temperature zones.

The incline 20 can be between about 1° and about 20° off of horizontal 30, with the preferred incline being about +2° to about +6°. The reactor 10 can also be oriented or pitched in the opposite direction, or at a decline between about 1° and about 20° off of horizontal 30, with the preferred decline being about −2° to about −6° for declining orientation. This gives a possible range of between about −20° to about +20° with respect to the horizon 30.

Figure 2:
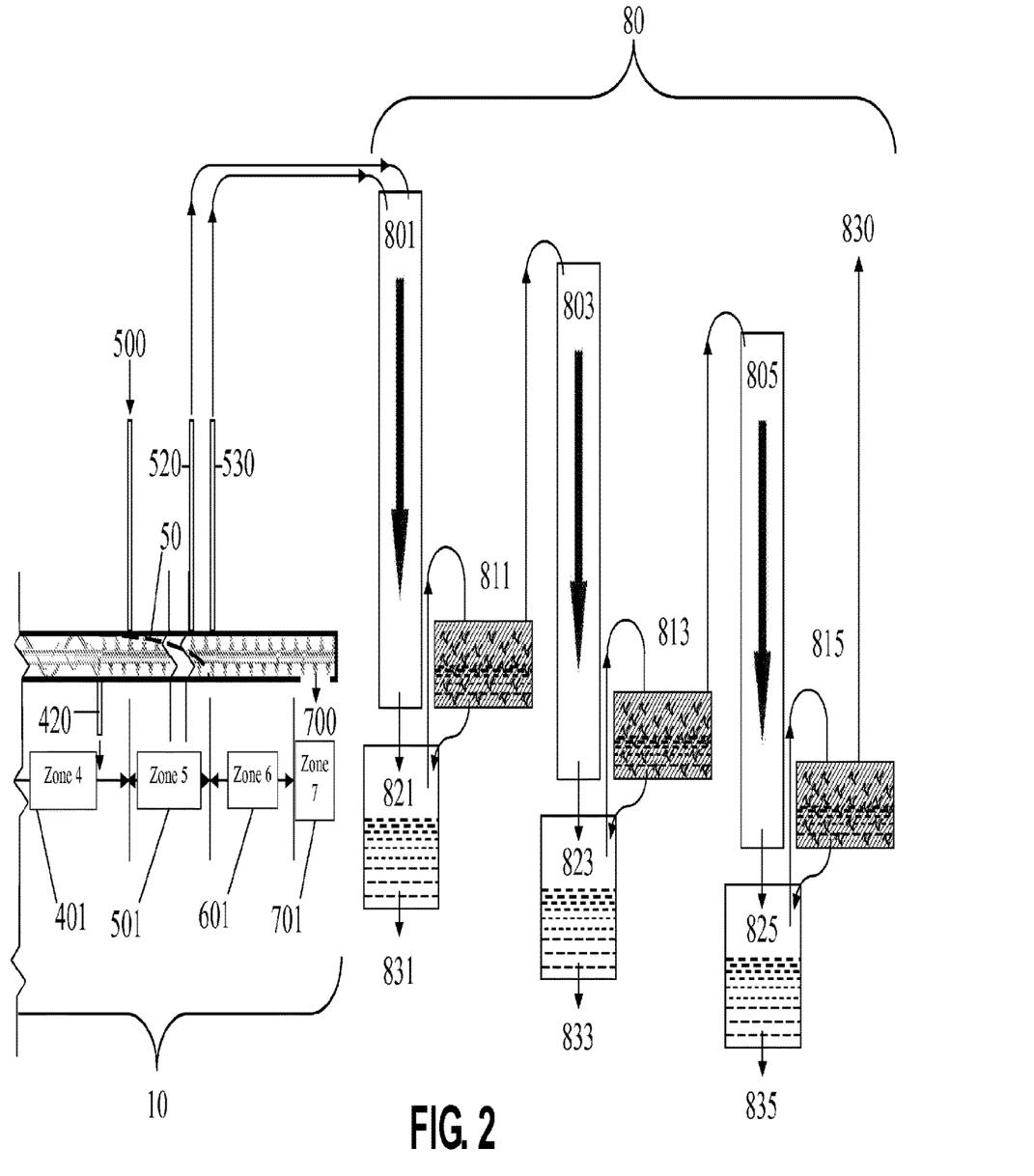
FIG. 2 is a schematic side view of a step-down condenser array and its deployment downstream of a zone-delineated thermal reactor in accordance with the present invention.

The preferred embodiment of incline is deployed when raw material compositions, which, upon heating, result in throughput viscosities which can be transported through an inclined screw reactor. Vapors evolving from decomposition of the raw material move downstream and up-slope through progressively hotter zones until reaching discharge ports 520 and 530 under the relative vacuum of the integral condenser train, one embodiment of which is illustrated in FIG. 2. In inclined deployment, zone-delineated heat control is readily maintained in the solid and melt phases while this denser material makes continuous contact with the heated skin of the cylindrical reactor and/or an optional heated internal screw deployed when external heating alone cannot overcome the poor thermal conductivity of the hydrocarbonaceous material. In inclined deployment, melt level 50 is maintained at a vertical elevation dictated, in dynamic equilibrium, by the rate of mass loss in Pyrolysis Zone 5 501 versus rate of feed introduction in Zone 1 101. In any inclined orientation, the thermal reactor operates as a screw reactor in Zones 1 through 3 and Zones 5 through 7, and as a stirred plug reactor in Zone 4 401.

The opposite orientation of decline is deployed when raw material compositions, which, upon heating, result in throughput viscosities which are difficult to transport through in an inclined screw reactor. In this declined deployment, zone-delineated heat control can be maintained in the vapor phase in open headspace as vapor evolving from the raw material moves downstream and down-slope through progressively hotter zones until reaching discharge ports 520 and 530 under the relative vacuum of the integral condenser train. To further promote and accelerate this vapor movement, and to minimize the tendency for excessive heat to rise in the open headspace of a reactor in declining orientation, thereby potentially over-cracking vapor-phase molecules, a portion of the non-condensable gas discharged from the final condenser can be optionally re-injected into the reactor at injection port 400 and/or steam withdrawn from vent 200 can be optionally re-injected into the reactor at injection port 400. The preferred temperature of injected non-condensable gas and/or steam, if any, is slightly below the operating temperature of the point of injection. The injection temperature is high enough to prevent any condensation, thereby keeping the injected vapor in the vapor phase, but low enough to consume heat energy from the head space, thereby mitigating any condition of excessive cracking of vapor-phase molecules. Although vapor phase heat regulation is important in all phases in any orientation, consideration of heat regulation in the vapor phase becomes especially critical in the declining orientation because melt level will, as the result of flow of melt in response to the force of gravity, be a long, declining surface above which head space open to vapor flow will be present over a much greater length of reactor 10 and a much broader range of temperatures in reactor 10 than in the opposing inclined orientation. In declined deployment, Zone-delineated heat control can also be maintained in the denser solid and melt phases as they make continuous contact with the heated skin of the cylindrical reactor and/or an optional heated internal screw deployed when external heating alone cannot overcome the poor thermal conductivity of the hydro carbonaceous material. In the declined orientation, although the thermal reactor operates as a screw reactor in Zones 1 through 3 and Zones 5 through 7, and as a stirred plug reactor in Zone 4, solid and melt phase material retention time in Zone 4 is likely to be reduced by its tendency to flow downhill in response to the force of gravity, necessitating increase in the length of Zone 4 for the declined orientation to maintain adequate residence time for molecular destabilization and heteroatom scavenging reactions to occur to the desired degree of completion.

In either the inclining or declining embodiment, proper placement of discharge ports 520 and 530 provides for optimum recovery of vapor-phase hydrocarbon molecules without over-cracking and resultant excess non-condensable gas and char production. Given that discharge ports 520 and 530 are in plurality with condensers 80, and that operation of condensers results in relative vacuum consistent with removal of vapor-phase molecules from the vapor stream, it is important to recognize and use this resource of relative vacuum to the benefit of the process. Accordingly, the preferred embodiment is placement of discharge port 520 in Zone 5 501 immediately above melt level 50 in the inclined deployment of reactor 10; there is no adjustment to this preferred embodiment in the declined deployment of reactor 10. Placement of discharge port 520 as described allows for removal of evolved vapor before that vapor would otherwise experience the higher temperature environment of Zone 6 601 in which gas-prone cracking and coking occur. Likewise, placement of discharge port 530 at the transition between Zone 5 501 and Zone 6 601 promotes immediate quenching of vapor evolving from Zone 6 601, such vapor containing residual aromatic hydrocarbons that, if not quenched as they enter discharge port 530, would otherwise be coked to char and methane if they were to remain in Zone 6 601 and Zone 7 701.

The temperature of the apparatus is varied along its length from Zone to Zone, depending on the desired functionality, and is controlled via external heating means (not shown). Optionally, the internal screw can also be heated when external heating alone cannot overcome the poor thermal conductivity of the hydrocarbonaceous material. The heating means is not critical, and can include electric heating elements, radiant heating, direct fired heating thereby consuming the gaseous product produced by the present invention, thermal jacketing, using heat transfer medium known to the industry, including but not limited to, Dowtherm®, molten lead, molten salt, molten sodium, and the like.

Although modest temperature variation over operating periods is well tolerated by the reactor 10, for purposes of efficiency and to maintain the plurality between Zone temperature and residence time, it is desirable to maintain dynamic equilibrium in reactor 10. Dynamic equilibrium is achieved by maintaining a constant raw material throughput rate and constant reactor temperatures in each Zone once these temperatures have been achieved when operations ensue. The slower the raw material throughput, the longer the residence time. Although the dynamic equilibrium has been interrupted, less heat may be required to successfully drive the desired chemical reactions over a longer residence time so long as operations continue within rate-determining limits. In contrast, the faster the raw material throughput, the shorter the residence time. Although the dynamic equilibrium has been interrupted, more heat may be required to successfully drive the chemical reactions over a shorter residence time so long as operations continue within rate-determining limits. In both cases, if rate-determining limits are exceeded by variations in temperature and/or residence time, the desired reactions will not be experienced, and undesirable reactions may result. Accordingly, if the dynamic equilibrium is not maintained, operations in disequilibrium pose risk to efficient system operation and consistency in product quality.

Although it is critical to maintain the plurality between Zone temperature and residence time, limits exist as to functional ability to maintain this plurality if the dynamic equilibrium is interrupted. These limits stem from, among other things, reactor design capacity, fixed thermal conductivity of the hydrocarbonaceous material and reaction kinetics. For example, an excessive feed rate beyond that contemplated in reactor design is likely to result in residence times being insufficient to facilitate heat transfer to the hydrocarbonaceous material. Those reduced residence times may be insufficient for the desired reactions to achieve the desired level of completion even if adequate heat could be transferred to the hydrocarbonaceous raw material. In another example, in an attempt to compensate for faster raw material throughput, one might increase the temperature of the heating system. Although limited benefit is achieve by this action, the temperature differential between heated surfaces and the hydrocarbonaceous material can become so extreme as to prematurely promote reactions which ideally should occur in a successive Zone, thereby losing Zone definition in the reactor 10. Risks created by overheating to compensate for excessive throughput include creation of excessive reactor pressure/unsafe operation conditions, as well as overproduction of gas and char at the expense of solid wax and/or condensable hydrocarbon yield. In another example, a feed rate far below reactor 10 capacity or chronic interruptions to feed can result in excessive residence times. Denser components of the hydrocarbonaceous material can, in an inclined reactor orientation, settle to the bottom of the melt column, displace materials of lower density and collect at the bottom of the melt column, promoting reactor 10 fouling requiring unscheduled production shut-down to correct the problem. Similarly, in the declining orientation, denser components of the hydrocarbonaceous material can settle to the bottom of the reactor and collect behind each flighting blade, similarly fouling the reactor 10, although in many more places along the length of the reactor.

The reactor 10 is comprised of a series of distinct, throughput process Zones through which the raw material blend is continually heated and advanced. There are seven of these throughput process Zones: the Raw Material Feed Zone 101, the Compression Zone 201, the Melt Zone 301, the Mixing, Molecular Destabilization and Heteroatom Scavenging Zone 401, the Pyrolysis Zone 501, the Devolatilization Zone 601, and the Char Discharge Zone 701.

Zone 1: Raw Material Feed Zone.

This zone 101 is operated at ambient temperature and pressure for a residence time of less than one minute. In the embodiment of the present invention shown in FIG. 1, raw materials are introduced to the apparatus at the entrance 100. The exact means of introducing feed materials is not critical, and may be of any method known in the industry so long as the feed method selected is sufficiently robust and effective thereby avoiding failure to feed shredded and often highly compressible raw materials, and isolate undesirably large and bulky non-polymeric solid contaminants that will foul the reactor feed entrance 100 or the reactor 10 itself. The pitch ratio of the screw 110 in this zone is between 1.0 and 1.5. The purpose of this zone is to accept material into the apparatus 10 and move the material into the next zone.

The present apparatus 10 allows for the purposeful combination of mixed and/or varying solids with any quantity, including zero, of mixed and/or varying petroleum-based liquids. It provides for efficient conversion of widely variable raw material streams, highly contaminated raw material streams, and raw material streams having inconsistent compositions over time. Additionally, hydrocarbonaceous materials can be fed at entrance 100 to the reactor 10 with finely divided, mineral-based additives selected from one or more melt-phase heteroatom scavengers in forms including but not limited to oxides, hydroxides and/or carbides of the group consisting of alkali metals, alkaline earth metals, transition metals, post-transition metals and/or metalloids. Optionally, for example, when only light oil, diesel additive or gasoline additive is desired, feed materials can additionally include addition of one or more melt-phase catalysts in forms including but not limited to oxides, hydroxides and/or carbides of the group consisting of alkali metals, alkaline earth metals, transition metals, post-transition metals, metalloids, non-metals and/or naturally-occurring & synthetic silicate minerals.

Addition of mineral-based additives and/or melt-phase catalysts at entrance 100 is optional, depending upon factors including but not limited to composition of the raw hydrocarbonaceous materials, desired product mix, e.g. ratio of produced oil to produced gas, ratio of produced wax to oil and desired molecular composition of condensable hydrocarbon products. For example, when addition of heteroatom scavengers is desired, the weight percentage of heteroatom scavenger of the total hydrocarbonaceous material added to the reactor, such percentage ranging from 0% to 20% or more, is determined by weight of the scavenger in the reactor. Thorough dispersion of mineral-based additives and/or melt-phase catalysts is critical to efficient use of these mineral-based additives and/or melt-phase catalysts and to prevent reactor fouling, especially in Zones 1 through 4 resulting from the presence of excessive finely divided mineral-based additives and/or melt-phase catalysts. Some but not all of the heteroatom scavenger will be available to participate in the desired reactions if dispersion of the scavenger in the hydrocarbonaceous material is not be complete. Moreover, some of the heteroatom scavenger may aggregate in the hydrocarbonaceous material prior to or after introduction of the hydrocarbonaceous material to the reactor, thereby reducing its availability to participate in the desired reactions. If only one primary reaction involving heteroatom scavenger is anticipated, the optimal weight percentage of heteroatom scavenger added to the total hydrocarbonaceous raw material feed may be the sum of the amount of heteroatom scavenger stoichiometrically required to complete all desired dehalogenation and desulfurization reactions plus the amount of heteroatom scavenger not available to the desired reactions due to, for example, incomplete dispersion of heteroatom scavenger in the system. If more than one primary reaction involving heteroatom scavenger is anticipated, such scavenger can be consumed by competing reactions. As one of many possible examples, if the hydrocarbonaceous material includes polyvinyl chloride (PVC) and/or polyvinylidene chloride (PVDC) in the presence of polyesters of terephthalic acid (PET), competing reactions may include conversion of hydrochloric acid evolving from PVC and PVDC to calcium chloride salt and water, as well as promoting conversion of the sublimates terephthalic acid and benzoic acid evolving from the decomposition of PET to benzene. Accordingly, the amount of heteroatom scavenger added to the hydrocarbonaceous material must be sufficient to allow for all desired competing reactions to achieve completion. Similarly, the number of polymer species and their relative concentrations in the raw hydrocarbonaceous material will impact polymer decomposition rates. For example, citing simple first order kinetics, rate limited on a single species, the addition of more of that species can promote acceleration of the decomposition rate. Determination of optimum weight percentages, if any, of heteroatom scavengers to the raw hydrocarbonaceous material must be made with thorough knowledge of the composition of the hydrocabonaceous material, as well as any anticipated variance of that same material over time. Similarly, polymer decomposition rates can change via catalyst addition to the hydrocarbonaceous material whereby energy barriers are lowered, resulting in interactions to accelerate some, but not all, decomposition reactions. The selection and quantity of catalyst, if any, added to the hydrocarbonaceous material is also a function of the composition of the hydrocarbonaceous material.

Zone 2: Raw Material Volume Reduction/Compression Zone.

This zone 201 is operated to reduce the volume of the hydrocarbonaceous material, expel atmospheric air from the hydrocarbonaceous material at a temperature below the flash point of the hydrocarbonaceous material, and to generate and expel steam as moisture in the hydrocarbonaceous material boils. Zone 2 201 is operated with an internal temperature, as opposed to skin temperature, not less than ambient temperature and not more than 220° F., more or less, at ambient pressure or, optionally, for example when water vapor must be minimized in the reactor 10, under a vacuum 200 less than 0.1 atm, more or less, for a residence time of less than three minutes, more or less. In the embodiment of the present invention shown in FIG. 1, the pitch ratio of the screw 210 in this zone is between 1.5 and 2.0. The volume of the hydrocarbonaceous material is reduced, and feed materials are compressed by the rotating screw 210, which forces air and moisture, as steam, out of the system under optional vacuum 200. Raw material moisture reduction is accomplished thereby to a moisture content ranging from less than 1% moisture by weight up to 15% moisture by weight, more or less. In the preferred embodiment, moisture is reduced to about 10% by weight. Expelled air and moisture can be routed to a carbon bed; the moisture condensed and disposed of as waste water. The remaining air can, for example to promote odor control, optionally be directed to the air intake of a direct-fired reactor heating system or the air intake of a generator set ("genset", not shown) comprising a diesel generator fueled by the non-condensable gas product discharged from gas discharge port 830 (shown in FIG. 2) plus a dynamo. A genset is used to generate electricity, which can be used utilized by the apparatus and/or distributed to other parts of the facility. Possible uses for a genset include but are not limited to heating the reactor 10 and powering the motor that rotates the shaft 11.

Zone 3: Raw Material Melt Zone.

This zone 301 is operated with an internal reactor temperature range between 220° F. and 572° F., more or less, at in situ derived reactor pressure for a residence time of not less than 15 minutes and not more than 45 minutes, more or less. For example, if the hydrocarbonaceous material is composed of polyisobutylene, some or all of the polyisobutylene will enter Zone 3 as a melt, depending upon the isomers of polyisobutylene constituting the material. In another example, if the hydrocarbonaceous material is composed of low density polyethylene, the minimum Zone 3 operating temperature is 220° F. or more, in an operating temperature adequate to accomplish melting of all constituents have a melting point at or below 220° F., more or less. In yet another example, if the hydrocarbonaceous material is composed of polystyrene, the minimum Zone 3 operating temperature is 464° F. or more, in an operating temperature adequate to accomplish melting of all constituents have a melting point at or below 464° F., more or less. In the embodiment of the present invention shown in FIG. 1, the screw 310 has a pitch ratio between 2.0 to 5.0, with a preferred pitch of 2.5. If organic halogens are present in the melt, operation of the present invention will result in generation of a relatively modest yield of halogen acids in the temperature range of not less than 305° F. Additional hydrochloric acid may evolve in Zone 3 301 as the Zone 3 operating temperature approaches 572° F. In that event, salts resulting from the reaction of heteroatom scavenger and halogen acids will begin to form, acting with remaining halogen acids as melt-phase cracking catalysts generated in situ by operation of the present invention.

Zone 4: Mixing, Destabilization and Heteroatom Scavenging Zone.

This zone 401 is operated with an internal reactor temperature range of not less than 572° F. and not more than 690° F., more or less, and in situ derived reactor pressure for a residence time of not less than 30 minutes and not more than 120 minutes, more or less. The purpose of this section of the apparatus is to thoroughly mix the melt for a prolonged period, destabilize molecules comprising the melt, scavenge sulfur (desulfurize), and convert organic halogens to solid salts (i.e. dehalogenate). In a preferred embodiment, there is no helical screw in this zone; instead the shaft 11 drives a ribbon mixer 410. Other embodiments (not shown) could employ other mixing means such paddle mixers, cut and folded auger mixers, and the like. The reactor 10 operates as a plug reactor in Zone 4.

Polymer cracking in the raw materials is promoted by multiple-stage generation of hydrochloric acid, hydrobromic acid and/or hydrofluoric acid, as such acids are commonly identified as cracking catalysts. Concurrently and subsequently, reaction of these halogen acids with heteroatom scavenger results in conversion of organic halogens in the hydrocarbonaceous material to salts which are also identified as cracking catalysts. Accordingly, in addition to Zone 4 401 generation of hydrocarbon vapors as a result of decomposition of certain polymer plasticizers and additives in Zone 4, operation of Zone 4 also results in production of hydrocarbon vapors at temperatures well below those predicted by standard thermal and kinetic models. Upon condensation, such hydrocarbon vapors produced in Zone 4 401 result in not less than 2% nor more than 22%, more or less, of the total condensable product yield of the present invention. The efficacy of heteroatom scavenging and rate of production of product oil resulting from operation of Zone 4 401 are controlled by factors including but not limited to ramp rate to achieve Zone 4 operating temperature, residence time in Zone 4, and interplay of the geometry of Zone 4 vs. raw material throughput rate and composition. Zone 4 geometry is a function of factors including reactor 10 length, reactor diameter, screw design and, to a far lesser degree, total mass loss from Zone 4 melt. Heteroatoms removed from the hydrocarbonaceous melt via reactions in Zone 4 accumulate largely as salts in the char material, which is removed at a later stage, described below.

In addition to the products of pyrolysis recovered from subsequent segments of the present invention, microcrystalline and/or paraffin wax product can be directly discharged from takeoff port 420 located at the transition from Zone 4 401 to Zone 5 501. While mixed melt within the first half of Zone 4 maintains characteristics of melted plastic when discharged and examined upon freezing, as the material progressively advances within the last half of Zone 4 toward the transition of Zone 4 401 to Zone 5 501, the material begins to experience cracking that is dominated by homologous cracking, gradually losing viscosity and, upon freezing, becoming more friable, eventually taking on the characteristics of hard wax when held at adequate residence time in the temperature range of 352° C. (670° F.) to 365° C. (690° F.). Given that relatively little char has formed prior to pyrolysis in Zone 5, wax discharged from takeoff port 420 is contaminated only by dissolved lower molecular weight hydrocarbon molecules which have not evolved from the wax as vapor, non-hydrocarbonaceous components of the raw material introduced into the reactor, and reaction byproducts, if any, of heteroatom scavengers, if any were introduced. The reactor can be operated with or without wax take-off. If the wax is not removed, it remains in the reactor in a liquid state, due to the temperature, and is further processed as an intermediate product in the liquid melt. If it is removed and recovered, it will cool to a solid state at room temperature. As such, wax is to be considered a solid product.

Certain non-polymeric materials in the hydrocarbonaceous material will participate in and/or promote reactions resulting in changes in end-product molecular composition. For example, the presence of paper as a contaminant of the raw hydrocarbonaceous material introduced into the reactor 10 may cause a proportional increase in concentration of aromatic and polynuclear aromatic hydrocarbons at the expense of paraffin and/or isoparaffin in the wax recovered from takeoff port 420 shown on FIG. 1 as well as in the condensable hydrocarbon vapors condensed and recovered from takeoff ports 831 and/or 833 and/or 835 shown on FIG. 2. If the primary products desired include an aromatic cut, the presence of paper in the raw material can offer an advantage. In another example, laminate food-packing wastes including aluminum foils as components of the laminate can be present in municipal waste plastics. After the polymer layers melt, the aluminum foil is released. The metallic surface of the aluminum promotes rapid depolymerization on its surface, resulting in increased yield of the wax fraction.

Wax discharge from takeoff port 420 results in a higher total process yield of condensable petroleum hydrocarbons than operation of the present invention with no wax discharge from takeoff port 420. When condensable hydrocarbons are removed as wax from takeoff port 420, those removed molecules do not experience pyrolysis in Zones 5 501, and 6 601, and the proportional yield of gas and char is lower. In general, the relatively limited amount of char suspended in wax discharged from takeoff port 420 is composed largely of carbon resulting from the decomposition of cellulose included as a contaminant to the raw material feed, non-polymeric matter included as a contaminant to the raw material feed, reacted and un-reacted heteroatom scavenger, if heteroatom scavenger is added, melt-phase catalyst created in situ, and any melt-phase catalyst added to the raw material feed.

Wax resulting from decomposition of mixed polymers and recovered from takeoff port 420 exhibits many characteristics of microcrystalline wax in contrast to paraffin wax, including ratio of unbranched to branched alkanes, darker color, higher melting point, hardness and adhesive characteristics. In general, if takeoff port 420 is located closer to or within the transition between Zone 4 401 and Zone 5 501, properties of the wax appear more like paraffin wax, although the content of suspended char is higher.

Successful recovery of microcrystalline and or paraffin wax product from takeoff port 420 is accomplished at inclined reactor orientation when the level of melt boundary 50, also described as the level of melted and destabilized hydrocarbonaceous material entering Zone 5 501 from Zone 4 401, is maintained by feeding the raw hydrocarbonaceous material to reactor 10 at an adequate rate to maintain the level of melt boundary 50. Unsuccessful recovery of microcrystalline and or paraffin wax product from takeoff port 420 results from allowing melt boundary 50 to fall below takeoff port 420 due to mass loss via vapor evolution and vapor discharge. If the feed rate is fast enough, melt boundary 50 will be maintained above discharge port 420. If the feed is too slow, melt boundary 50 will fall below discharge port 420. If the feed rate is too fast, the melt boundary 50 will be high enough to discharge "wax" from discharge port 420, but melt boundary 50 would rise to cover vapor discharge ports 520 and, in an extreme event, also cover discharge port 530, thereby preventing open vapor flow through the ports and creating undesirable high pressure conditions. In such a case, raw material feeding to the reactor at an excessive throughput rate could result in a condition where the hydrocarbonaceous material has inadequate residence time to pyrolyze in succeeding Zone 5 501. Accordingly, raw material feeding to the reactor at an excessive rate could also result in fouling of subsequent Zones 6 601 and 7 701 with un-reacted hydrocarbonaceous material. As a safety measure and to prevent an unanticipated acute or even catastrophic reactor failure, standard pop-off valves (not shown) are positioned on reactor 10 at positions including the transition between Zone 4 401 and Zone 5 501, as well as in Zone 6 601.

Successful recovery of microcrystalline and or paraffin wax product from takeoff port 420 is accomplished at declined reactor orientation with lower risk of covering vapor discharge ports 520 and 530 thus lower risk of creating undesirable high pressure conditions.

Zone 5: Pyrolysis Zone.

This Zone 501 is operated with an internal reactor temperature range appropriate to the blend of raw material introduced into the primary thermal reactor, commonly between 365° C. (690° F.) and 393° C. (740° F.), more or less, at the lower end of the temperature range, and 454° C.-488° C. (850° F.-910° F.), more or less, at the upper end of the temperature range, and at in situ derived reactor pressure, generally not more than 5.0 psig, more or less, for a residence time of not less than 30 minutes and not more than 90 minutes, more or less. In the embodiment of the present invention shown in FIG. 1, the screw 510 has a pitch ratio between 2.0 to 5.0, with a preferred pitch ratio of 2.5 to 3.0. The lack of oxygen, coupled with high temperature over the required residence time, results in various pyrolysis reactions taking place governed by high-order reaction kinetics, breaking down the polymeric material into volatile vapors and char material. The vapor stream is composed primarily of vapor, but may contain aerosol liquids and condensable molecules. This vapor stream is subject to further downstream treatment (described below), wherein condensable and non-condensable vapors are separated. The condensable vapors form liquids, including oil, light sweet crude oil, fuel additives, and base oil. A fraction can form solid products, in the form of slack wax. The non-condensable vapors or gases are recovered and can be optionally passed to a genset (described above) to produce electric power or can be circulated prior to use elsewhere as the vapor blanket over liquid product (discussed in more detail below).

The ultimate yields of condensable hydrocarbons, as well as relative material balance of oil, gas, char and inorganic residue, are controlled by several factors. These factors include, but are not limited to, operating temperature, interplay of the geometry of Zone 5 501 versus raw material throughput rate, residence time required for pyrolysis reactions to go to completion, desired magnitude of reaction completions, raw material composition, and recovery, if any, of wax product from takeoff port 420. Zone 5 geometry is a function of factors including but not limited to reactor length, reactor diameter, screw/mixer design, and forecasted rate of mass loss via vapor evolution and emission from Zone 5 melt, such mass loss being a key input from an interactive thermal and kinetic model into design of Zone 5 geometry. The process comprising the present invention is characterized by the virtual absence of oxygen and organic halogens in Pyrolysis Zone 5 501 coupled with the presence of in situ derived catalysts, including salts.

Operation of Zone 5 501 results in significant loss of mass of the hydrocarbonaceous material as pyrolysis proceeds on the continuously advancing hydrocarbonaceous material, and vapor is expelled from the reactor. Accordingly, when reactor 10 is in an inclined orientation, at the transition from the termination of Zone 4 401 to the beginning of Zone 5 501 the internal volume of the inclined reactor in Zone 5 is saturated with molten hydrocarbonaceous material. However, as the material is advanced along the length of Zone 5, the internal volume of reactor in Zone 5 is no longer saturated with molten hydrocarbonaceous material, resulting in the melt boundary 50. This creates head space and relative volumetric increase in head space over the molten and pyrolyzing hydrocarbonaceous material as the material is advanced toward Zone 6 601. The surface of the melt boundary 50 of the pyrolyzing hydrocarbonaceous material is a boiling and dynamic transitional interface of vapor above incompletely pyrolyzed hydrocarbonaceous material. This surface 50 continually rises and falls as it boils under conditions of the dynamic equilibrium until the hydrocarbonaceous material is effectively pyrolyzed, leaving only the solid char material and any incompletely pyrolyzed hydrocarbonaceous material to be advanced into Zone 6 601 for devolatilization and coking. Accompanying and correlative change in viscosity of the hydrocarbonaceous material is experienced in the reactor as pyrolysis proceeds to completion.

Optionally, for example, in cases where accelerated evacuation of product vapor from the reactor 10 is desired, and depending upon the product mix desired, a non-condensable carrier gas can be introduced into the coldest portion of Zone 5 501 at purge gas port 500. Such non-condensable carrier gas is comprised of nitrogen and/or a recycled non-condensable gas fraction resulting from operation of the present invention and/or methane from natural gas. Use of a recycled gas and/or methane as an alternative to nitrogen for carrier gas has a benefit of increased BTU content of produced process gas in the absence of dilution by nitrogen, as well as decreased operating expenses by eliminating the need to purchase or generate nitrogen. This aspect of the present invention can, depending upon raw material composition and range of operating conditions, also result in the unanticipated benefit of increase in oil yield, unanticipated albeit modest benefit of slight increase in hydrogen concentration of the reactor atmosphere in the pyrolysis environment, and an unanticipated increase in the hydrogen concentration of resulting process gas.

Zone 6: Char and Residual Solids Devolatilization Zone.

Zone 6 601 serves to drive volatile hydrocarbons from the char as well as to convert any remaining oligomer and semi-volatile aromatic hydrocarbons to coke. Zone 6 is operated with an internal reactor temperature not less than the maximum pyrolysis temperature appropriate to the blend of raw material introduced into the thermal reactor, commonly between 454° C. (850° F.) and 488° C. (910° F.), more or less, and not greater than 982° C. (1800° F.), more or less, commonly and preferably between 593° C. (1100° F.) and 649° C. (1200° F.), more or less, and at in situ derived reactor pressure, generally not more than 5.0 psig, more or less. Zone 6 601 is operated at an in situ derived reactor pressure, generally not more than 0.8 psig, more or less, and a residence time of not less than 15 minutes and not more than 60 minutes, more or less. In the embodiment of the present invention shown in FIG. 1, the screw 610 has a pitch ratio between 2.0 to 5.0, with a preferred pitch ratio of 2.5 to 3.0. Vapor resulting from reactions occurring in Zones 5 501 and 6 601 is discharged to outlets 520 and 530 positioned in Zone 5 501 and Zone 6 601. The outlets can be a single outlet 520, or a plurality of outlets, including back-up or auxiliary outlets 530.

A scrubber (not shown) can be used to recover any residual halogens not captured in Zone 4 401 prior to discharge to step-down condensers 80. This heteroatom scrubber is operated in a temperature range appropriate to recovery of halogens in each unique raw material blend, but not at an excessive temperature to promote cracking, for example between 338° C. (640° F.) and 365° C. (690° F.), more or less.

Vapor resulting from operation of Zone 6 601 can be optionally routed to catalyst reactors and/or reflux reactors and/or fractionation columns (collectively, not shown) for further processing prior to discharge to step-down condensers 80. Vapor emanating from Zones 5 501, 6 601 and/or 7 701 of the primary thermal reactor 10 and/or the scrubber can be routed to one or more secondary catalyst reactors and/or reflux reactors and/or fractionation columns (collectively, not shown). These reactors and/or columns are designed to optimize molecular size and molecular species distribution in the condensable product as may be desired.

In addition, the purpose of Zone 6 601 includes completion of molecular cracking to the desired end point, also targeting decomposition of some but not all silanes and siloxanes. Notably, of the hydrocarbonaceous material including polyfluoroethylene (PTFE), chloromethylaromatic silanes (a component of flexible, multi-layer circuit boards) or other halogenated species for which kinetic models describe dehalogenation at temperatures exceeding 454° C. (850° F.), capture of said halogens must be accomplished at a scrubber (not shown) located downstream from reactor 10 and upstream of the condenser array 80.

Optionally, if olefin content of the condensable products is problematic, an anti-oxidant/stabilizer/inhibitor (hereinafter referred to as "inhibitor") can be injected downstream from discharge from reactor 10 and downstream from a point of vapor discharge from any catalyst reactors and/or reflux reactors and/or fractionation columns where temperature mitigation is sufficient. The inhibitor may be comprised of 4-tert-butylcatechol, other alkyl catechols, 2,6-dinitro-p-cresol (DNPC), cuts of whole or topped asphaltic crude oil, phenylenediamine and/or commercially available materials in the category of oxy-compound inhibitors. The inhibitors are introduced to inhibit broad spectrum, downstream oxidative reactions involving metastable molecular species as well as additive polymerization which would otherwise occur. The refluxed product stream at a temperature of about 280° F. can be injected with inhibitor at a rate of about 0.00001 to 0.05 mole percent to condenser 801 if condenser 801 is operated at a maximum temperature below about 280° F. or injected to condenser 803 if condenser 801 is operated at a maximum temperature above about 280° F.

Product vapor is discharged from discharge ports 520 and 530 or, if deployed, downstream catalyst reactors and/or reflux reactors and/or fractionation columns and/or scrubbers to step-down condensers 80 in series, for example to condensers 801, 803 and 805 shown on FIG. 2, optionally supplemented by demisters 811, 813 and 815 between condensers for those required applications where more efficient separation than condensers alone can achieve. A final demister system (not shown) can be deployed at the termination of the condensation train when it is necessary to very efficiently remove residual aromatic hydrocarbons from the non-condensable gas product. Each condenser in the series is operated within a predetermined temperature range specified to isolate molecules within desired dew point ranges, resulting in condensable products having respective API gravities and pour points and/or melting points. In FIG. 2, the first condenser 801 in the series 80 operates at the highest temperature range, and the final condenser 805 in the series operates at the coldest temperature range. Optional multiple demisters 811, 813 and 815 are operated at temperatures corresponding to the minimum operating temperatures of their respective condensers. The condensers and, where deployed, the demisters are fitted with collection vessels 821, 823 and 825, also known as knockouts, which provide for oil accumulation/takeoff, and oil-water separation as may be required for each petroleum cut that is to be recovered.

Condensable product cuts are recovered from each condenser and its dedicated demister to respective knockouts 821, 823 and 825 that provide for density separation of in situ derived water and oil. Multiple condensers deployed in series 80 constitute a series of step-down condensers, also known as a condenser train. As an example, if the step-down condenser train is constructed in a fashion adequate to recover at least 4 cuts, four step-down condensers are installed in series. Slack wax can be recovered from the first step-down condenser and its respective demister if operated between 300° F. and 360° F., more or less, or, alternatively, slack wax and base oil can be recovered from the first step-down condenser and its respective demister is operated between 130° F. and 300° F., more or less. Light sweet crude oil, sometimes described as diesel additive, can be recovered from the second step-down condenser and its respective demister if operated between 90° F. and 130° F., more or less. The majority of water can be recovered coincident with recovery of $C_4$-$C_8$ hydrocarbons, sometimes described as condensate or gasoline additive, from the third step-down condenser and its respective demister if operated between 60° F. and 90° F., more or less. A light aromatic cut, as well as the principal balance of water, is recovered from the fourth and final step-down condenser and its respective demister if operated between 35° F. and 60° F. more or less.

Liquid product can be routed to remote day tanks 831, 833 and 835 as depicted in FIG. 2 and subsequent product sale. Product tanks containing liquids having higher pour points or wax products that must be transported in the molten state are heated to a point minimally above respective product pour points and/or melting points to provide for product transfer without distilling the products in their respective day tanks. The preferred embodiment is to maintain an anaerobic, non-condensable vapor blanket over liquid products to minimize product degradation via oxidation and retard the formation of tar and varnish resulting from additive polymerization that may occur, attributed to the presence of olefins, especially if inhibitor (as described above) is not added to the product. The vapor blanket can be comprised of non-condensable product gas produced by the apparatus and discharged from gas discharge port 830. Tank vapor inlets and vents can be pressure regulated and can be integral to the non-condensable gas discharge port 830 of the present invention. Heavy cuts recovered from the first condenser 801 can be recycled back into the process as described above if recovery and sale of heavy cuts is not desired.

Residual, non-condensable gas is recovered from non-condensable gas discharge port 830 and can be optionally passed to a genset (described above) to produce electric power. As previously noted, possible uses for this electric power include but are not limited to heating the reactor 10 and powering the motor that rotates the shaft 11. Alternatively, the recovered non-condensable gas can be circulated prior to use elsewhere as the vapor blanket over liquid product in the liquid product tanks, consumed as fuel for direct-fired heating of the reactor apparatus, consumed as fuel for other purposes, or flared.

An optional genset, deployed when electric power generation is advantageous such as in remote locations or if the price of electricity is prohibitive, can take in make-up air from the compression zone 201 and/or areas where odor control is desired, e.g. post-consumer plastic raw material inventory storage, product driers and the like. Exhaust from the genset is routed to an air pollution control system.

In situ derived water, recovered from moisture entering the primary thermal reactor with the raw hydrocarbonaceous material and created by chemical reactions in the primary thermal reactor and elsewhere, can be separately recovered from the bottom of the knockouts 821, 823 and 825 as depicted in FIG. 2, passed over a carbon bed to adsorb dissolved aromatic hydrocarbon compounds, and subsequently vaporized to steam using waste heat from the genset, if deployed, from direct-fired heating of the reactor, and/or from elsewhere. Optionally, some portion of this steam can be returned to the process at injection port 400 located either in Zone 3 (as depicted in FIG. 1) or in Zone 4, or alternatively injected in Zone 5 purge gas port 500 to promote the water-gas shift reaction. Alternatively, it can be routed to the air pollution control system as steam.

Zone 7: Char and Solids Discharge Zone.

This zone 701 is operated with an internal reactor temperature range of not less than the maximum temperature of the preceding Zone 6 601 and not greater than 1,800° F., more or less, at the start of the discharge zone to ambient temperature at the conclusion of discharge. It is operated at in situ derived reactor pressure, generally less than the system pressure experienced in Zone 6 601 and not more than 1.0 psig, more or less, experienced in Zone 7 and downstream from vapor takeoff ports 520 and 530 which operate at relative vacuum due to their respective discharge to condensers 80. The residence time in the char discharge zone is not less than 15 minutes and not more than 30 minutes. Solid char is removed from the system, and inert contaminants including but not limited to glass, stones, metal and the like are sequestered from the reactor thereby with the char. In the embodiment of the present invention shown in FIG. 1, the screw 710 has a pitch ratio between 2.0 to 5.0, with a preferred pitch ratio of 3.0 to 3.5. Solids from Zone 7 701 are discharged via char exit 700. Solids can be discharged to a sealed, cooled continuous process solids takeoff system (not shown) which can be a part of Zone 7 701. At its hot end, the char is purged with methane from natural gas. The system is designed to collect and/or separate and cool the solids, prevent re-adsorption of aromatic hydrocarbons and polynuclear aromatic hydrocarbons onto the char via ethane purge, and convert vapor entrained in the solids stream from a hot, anaerobic atmosphere dominated by methane purge gas in Zone 7 701 downstream from char exit 700 to atmospheric air at a temperature below the flash point of the solids at the termination of Zone 7 701. This is done in such a manner so as to prevent spontaneous combustion and mitigate a dust explosion hazard. Given the very high insulating capacity of char, adequate residence time to allow cooling is critical to avoid spontaneous combustion.

The ability of the present invention to prevent the re-adsorption of aromatic hydrocarbons and polynuclear aromatic hydrocarbons onto the char in Zone 7 701 is an important improvement over prior char recovery attempts. Pyrolysis char is notoriously known as being "sticky" given the presence of adsorbed tar composed of aromatic and polynuclear aromatic hydrocarbons. This problem is solved by the ability of the present invention to prevent re-adsorption of aromatic hydrocarbons and polynuclear aromatic hydrocarbons onto the char by hot methane purge prior to final cooling as it is discharged. As a result, given the absence of nearly all aromatic and polynuclear aromatic hydrocarbons, if the char must be disposed of as a waste, char discharged from Zone 7 701 of the present invention does not exhibit the D018, D023, D024, D025, D026 or D036 toxicity characteristics of hazardous waste as described in 40 CFR Part 261.20. Given the great difference in disposal cost between non-hazardous solid waste and hazardous waste, this improvement of the present invention provides a means to dispose, if necessary, char as non-hazardous solid waste in contrast to hazardous waste as identified by the hazardous waste codes previously identified.

Fouling is a common problem and can occur at various points in the apparatus. Such points include discharge nozzles exiting the primary thermal reactor. This fouling is a result of deposition of char, varnish, tar, terephthalic acid, benzoic acid, mineral salts and the like. These deposits can be removed and/or prevented from accumulating in various ways. One method is by operation of one or more mechanical rapper systems which are installed in the interior of the nozzles or other ports. One preferred embodiment of a rapper system is described in U.S. patent application Ser. No. 13/735,677, "Anti-Fouling Apparatus for Cleaning Deposits in Pipes and Pipe Joints" filed Jan. 7, 2013. That rapper apparatus is designed to abrade the interior of surfaces prone to fouling while allowing bypass of vapor so as not to create unwanted pressure drops and pressure fluctuations, and are operated via scheduled manual use or via electronic control. The resulting vapor is passed through a filter element comprised of ceramic, glass fibers, and/or an electrostatic device to mitigate passage of suspended particles to successive segments of the system. This reduces downstream system fouling, undesirable downstream chemical reactions, including catalysis, promoted by the presence of particles of char and/or salts and oxides and entrained/suspended particulate matter otherwise contributing to total metals concentration in the condensable products.

Although the invention has been described in detail with reference to particular examples and embodiments, the examples and embodiments contained herein are merely illustrative and are not an exhaustive list. Variations and modifications of the present invention will readily occur to those skilled in the art. The present invention includes all such modifications and equivalents. The claims alone are intended to set forth the limits of the present invention.

What is claimed is:

1. An apparatus for pyrolyzing hydrocarbonaceous materials comprising:
   a substantially cylindrical and linear reactor having a plurality of reactor zones in fluid communication with each other, and
   a single screw in communication with all the reactor zones to transport the hydrocarbonaceous material through the reactor, and
   wherein the plurality of reactor zones comprise:
      a reduction and compression zone,
      a melt zone, wherein the hydrocarbonaceous material is maintained for a predetermined residence time range and a predetermined temperature range to form hydrocarbonaceous material melt,
      a mixing, destabilization and heteroatom scavenging zone, wherein the hydrocarbonaceous material melt is mixed over a controlled residence time and temperature, wherein the molecules comprising the hydrocarbonaceous material melt is destabilized, sulfur in the hydrocarbonaceous material melt is scavenged by heteroatom scavenger, and organic halogens in the hydrocarbonaceous material melt is converted to solid salts,
      a pyrolysis zone, and
      a devolatilization zone,
   wherein the zones are continuously and serially operated, and product vapor is exited before the devolatilization zone,
   wherein the screw has a respective flight configuration within a reactor zone to maintain the hydrocarbonaceous material for a predetermined residence time range and a predetermined temperature range,
   wherein the single screw extends to a final exit of char and residual solids generated by the reactor.

2. The apparatus of claim 1 wherein the screw extends substantially through at least one of the plurality of reactor zones.

3. The apparatus of claim 1 wherein the reactor is oriented with respect to the horizon at an angle between about 20° to about +20°.

4. The apparatus of claim 3 wherein the reactor is oriented with respect to the horizon at an angle between about +2° to about +6°.

5. The apparatus of claim 3 wherein the reactor is oriented with respect to the horizon at an angle between about −2° to about −6°.

6. The apparatus of claim 1 wherein a temperature of the reduction and compression zone is between about ambient temperature to about 220° F.

7. The apparatus of claim 1 wherein a pressure of the reduction and compression zone is less than about 0.1 atm.

8. The apparatus of claim 1 wherein a residence time range of the reduction and compression zone is less than about 3 minutes.

9. The apparatus of claim 1 wherein a pitch ratio in the reduction and compression zone is between about 1.5 to about 2.0, wherein the screw is in communication with the reduction and compression zone.

10. The apparatus of claim 1 wherein a temperature of the melt zone is between about 220° F. to about 572° F.

11. The apparatus of claim 1 wherein a residence time range of the melt zone is between about 15 minutes to about 45 minutes.

12. The apparatus of claim 1 wherein a pitch ratio in the melt zone is between about 2.0 to about 5.0, wherein the screw is in communication with the melt zone.

13. The apparatus of claim 1 wherein a temperature range of the mixing, destabilization and heteroatom scavenging zone is between about 572° F. to about 690° F.

14. The apparatus of claim 1 wherein a residence time range of the mixing, destabilization and heteroatom scavenging zone is between about 30 minutes to about 120 minutes.

15. The apparatus of claim 1 wherein the hydrocarbonaceous material in the mixing, destabilization and heteroatom scavenging zone is mixed by a ribbon mixer.

16. The apparatus of claim 1 wherein the lower end of a temperature range of the pyrolysis zone is about 690° F., and the upper end of the temperature range of the pyrolysis zone is about 910° F.

17. The apparatus of claim 1 wherein a pressure of the pyrolysis zone is not more than about 5.0 psig.

18. The apparatus of claim 1 wherein the lower end of a temperature range of the devolatilization zone is about 850° F., and the temperature range of the devolatilization zone is not greater than about 1800° F.

19. The apparatus of claim 1 wherein a pressure of the devolatilization zone is not more than about 5.0 psig.

20. The apparatus of claim 1 wherein a residence time range of the devolatilization zone is between about 15 minutes to about 60 minutes.

21. The apparatus of claim 1 wherein a pitch ratio in the devolatilization zone is between about 2.0 to about 5.0, wherein the screw is in communication with the devolatilization zone.

* * * * *